Patented Sept. 19, 1950

2,523,147

UNITED STATES PATENT OFFICE 2,523,147

MANUFACTURE OF ORGANO-SUBSTITUTED ACIDS OF PHOSPHOROUS

Raymond M. Dean, Westfield, and Edward P. Cashman, Bayonne, N. J., assignors to Standard Oil Development Company, a corporation of Delaware No Drawing. Application June 14, 1948, Serial No. 32,997

18 Claims. (Cl. 260—461)

1

This invention relates to a method of producing disulfide derivatives of organo-substituted thiophosphorous and thiophosphoric acids.

It is known that the organo-substituted thiophosphorous and thiophosphoric acids may be converted into corresponding disulfide compounds by oxidation processes in which the hydrogen atoms of the sulfhydryl group are removed, permitting the sulfur atoms of two acid radicals to join. Chlorine has been proposed as an oxidizing agent for this purpose, but it has been found that in practice the chlorine also tends to chlorinate the organic portion of the acid molecule, and where this result is not desired chlorine is an unsuitable agent for the purpose. Bromine produces similar results. Iodine is less objectionable in this respect, but its use is not economically feasible for commercial purposes. Oxidizing agents containing metals, e. g. ferric chloride, cupric sulfate, permanganates, chromates, and the like, will react with the acid to form metal organo-thiophosphates.

In accordance with the present invention, the oxidizing process may be satisfactorily carried out without the accompaniment of side reactions by contacting the organo-thiophosphorous or organo-thiophosphoric acid with an oxide of nitrogen which has a higher proportion of oxygen in the molecule than nitrous oxide (NO). A suitable form of the oxide of nitrogen is the mixture of nitrogen oxides formed by the spontaneous decomposition of nitrous acid when the same is liberated from a metal nitrite by treatment of the latter with a mineral acid. These oxides contain nitrogen and oxygen in an overall ratio of about 2:3 by weight. These oxides consist largely of the trioxide ($N_2O_3$), but the dioxide ($NO_2$ or $N_2O_4$) and higher oxides and lower oxides such as NO or $N_2O$ are believed to be present in minor proportions. Any of these oxides or mixtures of the same may be contacted with the organo-thiophosphorous or organo-thiophosphoric acid, such acid being in the liquid phase, for the purpose of producing the disulfide derivative. The reaction is most conveniently carried out at or near room temperatures, but the reaction may be conducted at any temperature between the freezing and boiling points of the acid of phosphorus, and under some conditions somewhat elevated temperatures are desirable.

The process of the present invention may be illustrated by its application to the conversion of di-secondary butyl dithiophosphoric acid into the corresponding disulfide derivative, using nitrogen trioxide as the oxidizing agent. The mechanism of the reaction is represented by the following equation:

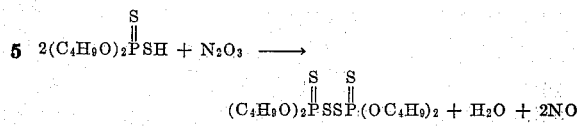

The reaction may be carried out conveniently by placing the secondary butyl thiophosphoric acid in a Milligan gas absorption bottle or in a series of such bottles and passing into these absorption bottles a stream of oxides of nitrogen generated in a separate apparatus by dropping concentrated sulfuric acid into an aqueous solution of sodium nitrite. After the oxidation reaction has been completed the reaction product, conveniently diluted with a solvent such as naphtha, is washed with a dilute aqueous alkali solution to remove unreacted secondary butyl thiophosphoric acid, then washed with water, and the solvent removed under vacuum.

The process of the present invention may be applied to the conversion of any acid of the formula

where R is any hydrocarbon radical, e. g., an alkyl, alkenyl, cycloalkyl, aryl, alkaryl, or aralkyl group, and $n$ is 0 or 1, into the corresponding disulfide derivative of the formula

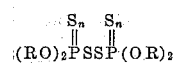

where R and $n$ have the same meaning as above.

The organo-substituted thiophosphorous and thiophosphoric acids may be prepared by known means, for example, by reacting an alcohol or phenol with a sulfide of phosphorus. Examples of the acids of phosphorus which may readily be converted into the disulfide products in accordance with the present invention include di-ethyldithiophosphoric acid, di-n-propyldithiophosphoric acid, di-isopropyldithiophosphoric acid, di-sec.-butyldithiophosphoric acid, di-sec.-butylthiophosphorous acid, di-octyldithiophosphoric acid, di-stearyldithiophosphoric acid, di-oleyldithiophosphoric acid, di-(tert.-octylphenyl) dithiophosphoric acid, di-(tert.-octylphenyl) thiophosphorous acid, di-benzyldithiophosphoric acid, and the like. The invention has particular application in the conversion of acids in which the organic group is an alkyl group containing 2 to 8 carbon atoms per molecule.

The following example illustrates in detail the application of the present invention to the conversion of di-n-propyldithiophosphoric acid into the disulfide derivative.

Example 1

Two Milligan gas absorption bottles containing a total of 350 g. of di-n-propyldithiophosphoric acid were connected in series, the bottle nearest the gas generator containing 200 g. and the other bottle containg 150 g. Nitrogen oxides were generated in a separate reaction vessel by adding 18 g. of concentrated sulfuric acid to 25 g. of sodium nitrite dissolved in 50 ml. of water over a period of 4 hours. These nitrogen oxides were mixed with nitrogen gas and led through the acid of phosphorous as they were generated, the mixture containing approximately 35 parts by volume of nitrogen to 1 part by volume of nitrogen oxides. Approximately 5 cu. ft. of nitrogen was used in the process. After the oxidation step, which was conducted at room temperature, had been completed the reaction mixture contained in the gas absorption bottles was dissolved in 200 ml. naphtha and washed twice with aqueous 10% caustic alkali solution to remove unreacted acid. After further washing with water until the washings were neutral and removing the naphtha under vacuum at 200° F., 73 g. of di-n-propylthiophosphoric disulfide was recovered. This represents a yield of 95% based on the amount of sodium nitrite used in generating the nitrogen oxides. The product was a liquid of about 90 seconds viscosity Saybolt at 100° F. and about ½ to 1 Robinson color.

The process of the present invention may be carried out, if preferred, by generating the nitrogen oxides in the reaction mixture containing the organo-thiophosphorous or organo-thiophosphoric acid. For example, an aqueous solution of sodium nitrite may be mixed with the acid of phosphorous and a mineral acid, e. g., sulfuric acid, may be added slowly to liberate the oxides of nitrogen. These oxides will immediately react with the acid of phosphorous to produce the disulfide derivative of the latter. For optimum yields, the alkali metal nitrite and mineral acid are each added in an amount which is a molecular equivalent of the acid of phosphorous present. This method may be illustrated by the following three examples.

Example 2

200 g. of di-secondary butyl dithiophosphoric acid was placed in a flask equipped with a stirrer, thermometer, and reflux condenser. An aqueous solution consisting of 18 g. sodium nitrite dissolved in 75 ml. water was added at 90° F. over a period of 1 hour. 13 g. of sulfuric acid was then added at the same temperature over a period of 1 hour. During this process nitrogen was blown through the reaction vessel at about 2 to 3 cu. ft. per hour for the purpose of excluding air during the oxidation step. The reaction product was then diluted with 200 ml. naphtha, washed twice with 5% aqueous sodium hydroxide solution, and then with water until the washings were neutral, and the naphtha stripped off under vacuum at 200° F. A yield of 80 g. of di-secondary butyl thiophosphoric acid disulfide was obtained. The product was a fluid oil of about 90 seconds viscosity Saybolt at 100° F., neutralization number 0.6, ¾+ Robinson color, and contained 29.6% sulfur.

Example 3

222 g. (1 mol.) of phosphorous pentasulfide was charged into a 3-liter 4-necked flask equipped with a dropping funnel, thermometer, suitable agitator and a gas outlet. 330 g. (4.4 mols) of secondary butyl alcohol was added and the temperature raised slowly to 220° F. over a period of 2 hours. After cooling to 125° F., 138 g. (2 mols) of sodium nitrite dissolved in 250 ml. of water was added over a period of 30 minutes, keeping the temperature below 135° F. 102 g. (1 mol) of 98% sulfuric acid was then added over a period of 1 hour, after which the temperature was raised to 150° F. and held at this point for an additional hour. After dilution with 200 ml. naphtha and washing twice with 5% aqueous sodium hydroxide solution the product was recovered by high vacuum distillation at 200° F. A product weighing 404 g. and consisting of a wine colored oil resulted. The product showed a neutralization number of 0.25, a Robinson color reading of 8½+, and a sulfur content of 29.3%.

Example 4

22 lbs. 3 oz. (1 mol) of phosphorous pentasulfide was charged into a 30 gallon glass lined Pfaudler reactor. 26 lbs. 6 oz. (4.4 mols) of n-propyl alcohol was added. The temperature was raised to 200° F. over a period of 1 hour and held at this point for 2 hours additional. After cooling to 90° F., 13 lbs. 13 oz. (2 mols) of sodium nitrite dissolved in 2½ gallons of water was added at 90° F. over a period of 1 hour. 10 lbs. 3 oz. (1 mol) of 98% sulfuric acid was then added over a period of 1 hour at 90° F. After adding 4 gallons of naphtha the reaction mixture was stirred for ½ hour, after which it was meshed 3 times with 5% sodium hydroxide and twice with water. The produce was recovered by high vacuum distillation at 200° F. 38 lbs. of a wine colored product resulted, having a neutralization number of 3.2, a Robinson color reading of 4½+, and a sulfur content of 31.4%.

In a modification of the process of the present invention the oxide of nitrogen may be mixed with air or oxygen when contacting the organo-substituted acid of phosphorus, or air or oxygen may be passed through the reaction mixture when the oxide of nitrogen is generated in the presence of the acids of phosphorus. When oxygen is present the lower oxide of nitrogen resulting from the oxidation reaction is again converted into a higher oxide of nitrogen, which again functions as an oxidizing agent. Considering nitrogen trioxide ($N_2O_3$) as the oxidizing agent, when the oxidizing reaction takes place this is reduced to nitric oxide (NO) in accordance with the equation shown above. When oxygen is present, the nitric oxide is again converted into nitrogen trioxide in accordance with the equation $$4NO + O_2 \rightarrow 2N_2O_3$$

Thus, in effect, the oxygen is the ultimate oxidizing agent. This modification of the process has advantages in reducing the amounts of oxides of nitrogen required in commercial operations, since with a small amount of oxides of nitrogen large conversions of organo-substituted acids of phosphorus to the disulfide can be accomplished.

As to the amounts of oxygen which should be present in this modification of the process of the invention, no specific proportions relative to the amounts of oxides of nitrogen are required for the operation. Since the process can be carried out without any oxygen present, the amounts of oxygen may be varied from extremely small amounts to quantities several times that of the nitrogen oxides present in proportions by volume. Generally, when air is mixed with oxides of nitrogen, ratios of 10 to 60 volumes of air to one volume of oxides of nitrogen are preferred, although the invention is not limited to these ratios. This modified process is illustrated by the following two examples.

*Example 5*

(a) 350 g. of di-secondary butyl dithiophosphoric acid was placed in two Milligan gas absorption bottles, as in Example 1. Approximately 5 cu. ft. of air containing the oxides of nitrogen generated in a separate reaction vessel from 25 g. of sodium nitrite and 18 g. of sulfuric acid, representing a ratio of about 35 parts by volume of air to one part by volume of nitrogen oxides, was blown through the absorption bottles over a period of 6 hours at 80–100° F. The reaction product was finished as in Example 1, and it was found that a yield of 285 g. of the disulfide product had been obtained. This represented a yield of 327%, based on the sodium nitrite employed. Since a yield of only 95% was obtained in Example 1, which was conducted in the absence of oxygen but otherwise in a similar manner, the advantages of using oxygen are apparent.

(b) A reaction was carried out in the manner described in (a) but with no oxide of nitrogen present. This resulted in no yield of the sulfide product, indicating that oxygen alone is not an effective oxidizing agent.

*Example 6*

The process of Example 2 was carried out, using the materials in quantities stated therein, and other conditions of the reaction being the same, but in the present case air was blown through the reaction mixture continuously during the oxidation step, a total amount of about 5 cu. ft. of air being so used. This represent a proportion of about 48 volumes of air per unit volume of nitrogen oxides. This resulted in a yield of 174 g. of di-secondary butyl thiophosphoric acid disulfide. It will be recalled that only 80 g. of the product was obtained in Example 2, where air was excluded from the reaction zone.

The disulfide derivatives of organo-substituted thiophosphorous and thiophosphoric acids produced in accordance with the process of the present invention are useful as additives for mineral lubricating oils, to which they impart oxidation resisting properties.

This invention is not to be considered as limited in scope by any of the foregoing examples, which are included for illustrative purposes only, but is to be limited solely by the terms of the appended claims.

What is claimed is:

1. A method of converting an acid selected from the class consisting of acids of the formula—

(RO)₂PSH and acids of the formula—

where R is any hydrocarbon radical, into the corresponding disulfide derivative of the class consisting of compounds of the formula—

(RO)₂PSSP(OR)₂ and compounds of the formula—

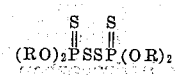

where R has the meaning given above, which comprises contacting said acid while in a liquid phase with an oxide of nitrogen having a higher proportion of oxygen in the molecule than nitrous oxide (NO).

2. A method according to claim 1 in which R of the formula is an alkyl group.

3. A method according to claim 1 in which R of the formula is an alkyl group containing 2 to 8 carbon atoms per molecule.

4. A method according to claim 1 in which the oxide of nitrogen is employed in a mixture of oxides of nitrogen in which the ratio of nitrogen to oxygen is about 2:3 by weight.

5. A method of converting di-n-propyldithiophosphoric acid into a disulfide derivative thereof which comprises generating oxides of nitrogen by adding sulfuric acid to an aqueous solution of sodium nitrite and contacting the oxides of nitrogen so generated with said di-n-propyldithiophosphoric acid at room temperature.

6. A method of converting an acid selected from the class consisting of acids of the formula—

(RO)₂PSH and acids of the formula—

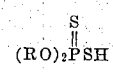

where R is any hydrocarbon radical, into the corresponding disulfide derivative of the class consisting of compounds of the formula—

(RO)₂PSSP(OR)₂ and compounds of the formula—

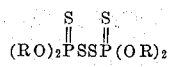

where R has the meaning given above, which comprises adding a mineral acid to a liquid mixture of said acid of phosphorus and an aqueous solution of an alkali metal nitrite.

7. A process according to claim 6 in which the mineral acid is sulfuric acid and in which the alkali metal nitrite is sodium nitrite.

8. A method according to claim 6 in which R of the formula is an alkyl group, in which the mineral acid is sulfuric acid, and in which the alkali metal nitrite is sodium nitrite.

9. A method which comprises adding an aqueous solution containing two molecular proportions of sodium nitrite to one molecular proportion of di-secondary butyl dithiophosphoric acid and subsequently adding to the mixture thus formed one molecular proportion of sulfuric acid.

10. A method which comprises adding an aqueous solution containing two molecular proportions of sodium nitrite to one molecular proportion of di-n-propyldithiophosphoric acid, and subsequently adding to the mixture thus formed one molecular proportion of sulfuric acid.

11. A method of converting an acid selected from the class consisting of acids of the formula—

(RO)$_2$PSH and acids of the formula—

$$(RO)_2\overset{S}{\underset{\|}{P}}SH$$

where R is any hydrocarbon radical, into the corresponding disulfide derivative of the class consisting of compounds of the formula—

(RO)$_2$PSSP(OR)$_2$ and compounds of the formula—

$$(RO)_2\overset{S}{\underset{\|}{P}}SS\overset{S}{\underset{\|}{P}}(OR)_2$$

where R has the meaning given above, which comprises contacting said acid, while in the liquid phase with an oxide of nitrogen having a greater proportion of oxygen in the molecule than nitrous oxide (NO), in the presence of oxygen.

12. A method according to claim 11 in which R of the formula is an alkyl group.

13. A method according to claim 11 in which R of the formula is an alkyl group containing 2 to 8 carbon atoms per molecule.

14. A method according to claim 11 in which the oxide of nitrogen is employed in a mixture of oxides of nitrogen in which the ratio of nitrogen to oxygen is about 2:3 by weight.

15. A method which comprises contacting di-secondary butyl dithiophosphoric acid while in the liquid phase with a mixture of an oxide of nitrogen having at least as great a proportion of oxide in the molecule as nitrogen trioxide (N$_2$O$_3$) and 10 to 60 times the amount of said oxide of nitrogen by volume of air at a temperature of 80°–100° F.

16. A method of converting an acid selected from the class consisting of acids of the formula—

(RO)$_2$PSH and acids of the formula—

$$(RO)_2\overset{S}{\underset{\|}{P}}SH$$

where R is any hydrocarbon radical, into the corresponding disulfide derivative of the class consisting of compounds of the formula—

(RO)$_2$PSSP(OR)$_2$ and compounds of the formula—

$$(RO)_2\overset{S}{\underset{\|}{P}}SS\overset{S}{\underset{\|}{P}}(OR)_2$$

where R has the meaning given above, which comprises adding a mineral acid to a liquid mixture of said acid of phosphorus and an aqueous solution of an alkali metal nitrite while passing a gas containing free oxygen through the reaction mixture.

17. A method according to claim 16 in which R of the formula is an alkyl group containing 2 to 8 carbon atoms per molecule, in which the mineral acid is sulfuric acid, in which the alkali metal nitrite is sodium nitrite, and in which the gas containing free oxygen is air.

18. A method which comprises adding to one molecular proportion of di-secondary butyl dithiophosphoric acid in a reaction vessel a concentrated aqueous solution containing about one-fourth molecular proportion of sodium nitrite at 90° F., subsequently adding to the mixture thus formed about one-eighth molecular proportion of sulfuric acid at 90° F., and during the addition of the said sodium nitrite and sulfuric acid passing air continuously through the reaction mixture.

RAYMOND M. DEAN.
EDWARD P. CASHMAN.

REFERENCES CITED

The following references are of record in the file of this patent:

UNITED STATES PATENTS

| Number | Name | Date |
|---|---|---|
| 1,763,852 | Johnson | June 17, 1930 |
| 2,060,815 | MacAfee | Nov. 17, 1936 |
| 2,298,387 | Kenton et al. | Oct. 13, 1942 |

OTHER REFERENCES

Lassar-Cohn, "Arbeitsmethoden fur Organisch-Chemische Laboratorien," Spezieller Teil (5th ed., 1923), pages 626, 751–754 and 770.

Ephraim, "Inorganic Chemistry" (94th rev. ed., by Thorne and Roberts, 1943), pages 668–674.